United States Patent
Bandyopadhyay et al.

(10) Patent No.: US 7,109,138 B2
(45) Date of Patent: Sep. 19, 2006

(54) COMPOSITION FOR PREPARATION OF SILICON CARBIDE POWDER

(75) Inventors: Siddhartha Bandyopadhyay, West Bengal (IN); Himadri Sekhar Maityi, West Bengal (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/974,014

(22) Filed: Oct. 27, 2004

(65) Prior Publication Data

US 2006/0089248 A1   Apr. 27, 2006

(51) Int. Cl.
*C04B 35/565* (2006.01)

(52) U.S. Cl. .......................... 501/88; 423/345
(58) Field of Classification Search ............... 501/88; 423/345
See application file for complete search history.

(56) References Cited

U.S. PATENT DOCUMENTS

| | | | | |
|---|---|---|---|---|
| 3,754,076 A | * | 8/1973 | Cutler | 423/345 |
| 3,836,356 A | * | 9/1974 | Irani | 75/419 |
| 3,920,446 A | * | 11/1975 | Irani | 75/10.67 |
| 5,525,556 A | * | 6/1996 | Dunmead et al. | 501/92 |

* cited by examiner

*Primary Examiner*—Karl E. Group
(74) *Attorney, Agent, or Firm*—Nixon & Vanderhye P.C.

(57) ABSTRACT

The synergistic composition consists of a mixture of a source of pure silica such as silicon dioxide, a source of carbon such as activated charcoal, β-silicon carbide and a source of iron such as ferric nitrate. The cost effective synergistic composition is useful for the preparation of improved silicon carbide powder containing at least 90% SiC preferably rich in the β-phase. Silicon carbide powder finds wide usage in the manufacture of products suitable for refractory and engineering applications.

7 Claims, No Drawings

COMPOSITION FOR PREPARATION OF SILICON CARBIDE POWDER

FIELD OF THE INVENTION

The present invention relates to a synergistic composition useful for the preparation of improved silicon carbide powder.

BACKGROUND OF THE INVENTION

Silicon carbide powder finds wide usage in the manufacture of products suitable for refractory and engineering applications. Silicon carbide powder is useful for the preparation of products suitable for refractory and engineering applications.

It is known in the art to prepare silicon carbide powder by firing an intimately mixed green mixture of fine silica (SiO$_2$) with carbon (C) under flowing argon gas atmosphere by following the equation as follows:

$$SiO_2 + 3C = SiC + 2CO \qquad (1)$$

Rice husk has conventionally been used as the source of fine silica (Lee et al. in Am. Ceram. Bull., Vol. 54, No. 2, pp. 195–98, 1975 titled "Formation of silicon carbide from rice hulls"). Krishnarao et al. (Ceram. Inter., Vol. 18, No. 4, 1992, pp. 243–49, titled "Distribution of silica in rice husks and its effects on the formation of silicon carbide") study and describe the importance of distribution of silica in the starting material and the role of catalyst. A maximum yield of 60% SiC is the theoretical amount that is producible when rice husk is used as starting material.

Guterl et al. (J. Eur. Ceram Soc., vol. 19, No. 4, 1999, pp. 427–32, entitled "SiC material produced by carbothermal reduction of a freeze gel silica-carbon artefact") teaches the fineness of both silica and carbon initial particle size. It is taught that monodispersed, extremely fine-sized silica powder with mean particle size ~25 nm was effective for silicon carbide preparation. In this study, a sol-gel route was used to prepare the extreme fine starting silica powder. Cervic et al. (Ceram. Inter., Vol. 21, No. 4, 1995, entitled "A comparison of sol-gel derived SiC powders from Saccharose and activated carbon") teach the importance of an extremely fine sized starting carbon with specific surface area of >950 m$^2$g$^{-1}$. In both above cases, a firing temperature of 1550° C. was required.

The requirement of further high firing temperature of 1550° to 1800° C. is reported in Martin et al. (J. Eur. Ceram Soc., vol. 18, No. 12, 1998, pp. 1737–42, titled "Synthesis of nanocrystalline SiC powder by carbothermal reduction"). Hanna et al. (Brit. Ceram. Trans. J., Vol. 84, No. 1, 1985, pp. 18–21, titled "Silicon carbide and nitride from rice hulls-III: Formation of silicon nitride") teaches the use of a source of iron in the starting composition under a flow of ammonia gas in place of argon/nitrogen gas and above 1350° C. silicon carbide. A maximum of 90% of the starting silica could be reduced up to 1500° C. resulting in a mixture of silicon carbide and silicon nitride when an amount >6 wt. % iron was used in the starting mixture.

The drawbacks of the above processes are manifold. Firstly, extremely fine grain sized silica is required which has to be prepared following the sol-gel technique resulting in enhanced costs. Secondly, the use of large excess of carbon in the starting mixture involves an additional firing at above 500° C. in air of the post-reacted product where the unreacted carbon has to be burnt off. Additionally, the failure of achieving carbidation up to the theoretical value signifies that some residual silica remains in the product where no other phase appears in the reaction product. The residual silica may be harmful in the ultimate use of the material. The use of iron produces silicon carbide along with silicon nitride where an addition of ~7 wt. % iron is required in case ammonia is the reacting gas.

The major drawbacks of the above noted hitherto known prior art processes are:
1. The starting silica particle size should be extremely small with surface area of the powder at least greater than 150 m$^2$/g which is produced following a very expensive sol-gel process.
2. The starting carbon particle size should also be extremely fine with surface area of the powder preferably greater than 150 m$^2$/g.

OBJECTS OF THE INVENTION

The main object of the present invention is to provide a synergistic composition useful for the preparation of improved silicon carbide powder, which obviates the drawbacks of the hitherto known prior art.

Another object of the present invention is to provide a synergistic composition useful for the preparation of silicon carbide powder containing at least 90 wt. % of the phase, which obviates the drawbacks of the hitherto known prior art.

Yet another object of the present invention is to provide a synergistic composition, wherein the synergistic composition consists of a source of pure silica, a source of carbon, β-silicon carbide, a source of iron.

Still another object of the present invention is to provide a synergistic composition, wherein ground naturally occurring and abundantly available silica is used.

Still yet another object of the present invention is to provide a synergistic composition, wherein the surface area of carbon used is of the order of 35 m$^2$/g.

SUMMARY OF THE INVENTION

The present invention provides a synergistic composition useful for the preparation of improved silicon carbide powder, wherein the composition consists of a synergistic mixture of a source of pure silica such as silicon dioxide, a source of carbon such as activated charcoal, β-silicon carbide and a source of iron such as ferric nitrate.

Accordingly, the present invention provides a synergistic composition useful for the preparation of improved silicon carbide powder, which comprises:
source of pure silica: 41 to 53 weight %;
source of carbon: 26 to 35 weight %;
β-silicon carbide (β-SiC): 3.5 to 14 weight %;
source of iron: 12 to 26 weight %.

In an embodiment of the present invention, the source of pure silica is pure and powdered silicon dioxide (SiO$_2$).

In another embodiment of the present invention, ground naturally occurring and abundantly available silica is used.

In yet another embodiment of the present invention, the source of carbon is pure and powdered activated charcoal.

In another embodiment of the present invention, the surface area of carbon used is of the order of 35 m$^2$/g.

In another embodiment of the present invention, pure and powdered β-silicon carbide (β-SiC) is used.

In a further embodiment of the present invention, the source of iron is ferric nitrate Fe(NO$_3$)$_3$.9H$_2$O.

The composition of the present invention is not a mere admixture having a mere aggregation of properties of the individual ingredients, but is a synergistic mixture having properties which are different from the properties of the individual ingredients.

DETAILED DESCRIPTION OF THE INVENTION

The composition of the invention is a synergistic composition and is useful for the preparation of improved silicon carbide powder. The composition comprises essentially:
source of pure silica: 41 to 53 weight %;
source of carbon: 26 to 35 weight %;
β-silicon carbide (β-SiC): 3.5 to 14 weight %;
source of iron: 12 to 26 weight %.

The source of pure silica is pure and powdered silicon dioxide ($SiO_2$). Ground naturally occurring and abundantly available silica is used. The carbon source is pure and powdered activated charcoal. The surface area of carbon used is preferably of the order of 35 $m^2/g$. Pure and powdered β-silicon carbide (β-SiC) is preferably used. The source of iron is ferric nitrate $Fe(NO_3)_3.9H_2O$.

The novelty of the present invention resides in providing a synergistic composition useful for the preparation of silicon carbide powder with improved properties. The novelty has been made possible by providing a composition which consists of a synergistic mixture of a source of pure silica such as silicon dioxide, a source of carbon such as activated charcoal, β-silicon carbide and a source of iron such as ferric nitrate.

Co-pending patent application Ser. No. 10/974,020 filed Oct. 27, 2004 describes and claims a process for the preparation of improved silicon carbide powder from the synergistic composition of the present invention, which comprises preparing a homogeneous mixture of the composition, passing the powder through 100 mesh, pressing the powder to form green compacts, sintering the green compacts at a temperature in the range of 14750° to 155° C., in argon atmosphere, to obtain silicon carbide powder.

In general, the carbothermic reduction of silica is sensitively guided by the initial particle size of the reactants. Under extreme reducing condition, a solid-solid reaction takes place where $SiO_2$ is reduced by solid carbon to form a mixture of vapour phase of SiO and CO. In a second set of reactions, SiO vapour reacts to form solid SiC. The formation of SiC starts from a heterogeneous nucleation on C and $SiO_2$ surface followed by growth from the gas phase reaction. Both the first phase of reactions as well as the nucleation are favoured by decrease in particle size of the starting solid reactants. When a small amount of finely divided α-SiC is used, these act as seeding material. These like phases themselves act as the heterogeneously nucleated sites and strongly favour SiC formation. On the other hand, the carbide formation is believed to relate to the existence of a Fe—Si liquid phase when iron is used in the starting mixture. The appearance of Fe and Si in the reaction site are due to the reduction of their respective oxides during firing. When the reaction proceeds, the liquid becomes saturated with carbon causing the precipitation of SiC. A continuous growth of the carbide occurs with simultaneous dissolution of silicon and carbon into the liquid to make it saturated. Except for solubility, the growth is believed to be controlled by the diffusivity of the constituent elements in the liquid after their dissolution. A larger amount of iron therefore, favours the formation of a larger amount of liquid which make the $SiO_2$ and C particles wet enough to serve as centres where the nucleation can take place. In the present case, it is believed that the added β-SiC particles in the starting mixture itself serve as the "like"—nucleation sites where from growth can occur. Therefore, the reaction does not require large amount of iron and produces similar yield at lower temperature of around 1500° C. which otherwise results from a reaction temperature of >1540° C.

The following examples are given by way of illustration of the use of the synergistic composition of the present invention and therefore, should not be construed to limit the scope of the invention in any manner.

EXAMPLE 1

A composition containing $SiO_2$—43.11 weight %, C—29.32 weight %, SiC—6.04 weight % and $Fe(NO_3)_3$ .$9H_2O$—21.53 weight % was ball milled for 5 hour, dried, cold pressed under uniaxial pressing and was fired at 1525° C. for 5 hour in an argon gas atmosphere under a linear gas flow rate of 40 $mh^{-1}$ at a pressure of 0.12 MPa. The firing weight loss was 116% of theoretical, calculated by following the equation no. 1 as stated above. The sample was blackish grey in colour containing soft agglomerates, grindable to produce fine sized powder. The x-ray diffraction shows SiC as the only crystalline phase present in the product.

EXAMPLE 2

A composition containing $SiO_2$—43.11 weight %, C—29.32 weight %, SiC—6.04 weight % and $Fe(NO_3)_3$ .$9H_2O$—21.53 weight % was ball milled for 5 hour, dried, cold pressed under uniaxial pressing and was fired at 1500° C. for 5 hour in an argon gas atmosphere under a linear gas flow rate of 40 $mh^{-1}$ at a pressure of 0.12 MPa. The firing weight loss was 109% of theoretical, calculated by following the equation no. 1 as stated above. The sample was blackish grey in colour containing soft agglomerates, grindable to produce fine sized powder. The x-ray diffraction shows SiC as the only crystalline phase present in the product.

EXAMPLE 3

A composition containing $SiO_2$—43.11 weight %, C—29.32 weight %, SiC—6.04 weight % and $Fe(NO_3)_3$ .$9H_2O$—21.53 weight % was ball milled for 5 hour, dried, cold pressed under uniaxial pressing and was fired at 1485° C. for 5 hour in an argon gas atmosphere under a linear gas flow rate of 40 $mh^{-1}$ at a pressure of 0.12 MPa. The firing weight loss was 103% of theoretical, calculated by following the equation no. 1 as stated above. The sample was blackish grey in colour containing soft agglomerates, grindable to produce fine sized powder. The x-ray diffraction shows SiC as the only crystalline phase present in the product.

EXAMPLE 4

A composition containing $SiO_2$—41.77 weight %, C—28.41 weight %, SiC—8.77 weight % and $Fe(NO_3)_3$ .$9H_2O$—21.05 weight % was ball milled for 5 hour, dried, cold pressed under uniaxial pressing and was fired at 1525° C. for 5 hour in an argon gas atmosphere under a linear gas flow rate of 40 $mh^{-1}$ at a pressure of 0.12 MPa. The firing weight loss was 132% of theoretical, calculated by following the equation no. 1 as stated above. The sample was blackish grey in colour containing soft agglomerates, grindable to produce fine sized powder. The x-ray diffraction shows SiC as the only crystalline phase present in the product.

EXAMPLE 5

A composition containing $SiO_2$—41.77 weight %, C—28.41 weight %, SiC—8.77 weight % and $Fe(NO_3)_3 \cdot 9H_2O$—21.05 weight % was ball milled for 5 hour, dried, cold pressed under uniaxial pressing and was fired at 1500° C. for 5 hour in an argon gas atmosphere under a linear gas flow rate of 40 $mh^{-1}$ at a pressure of 0.12 MPa. The firing weight loss was 121% of theoretical, calculated by following the equation no. 1 as stated above. The sample was blackish grey in colour containing soft agglomerates, grindable to produce fine sized powder. The x-ray diffraction shows SiC as the only crystalline phase present in the product.

EXAMPLE 6

A composition containing $SiO_2$—41.77 weight %, C—28.41 weight %, SiC—8.77 weight % and $Fe(NO_3)_3 \cdot 9H_2O$—21.05 weight % was ball milled for 5 hour, dried, cold pressed under uniaxial pressing and was fired at 1485° C. for 5 hour in an argon gas atmosphere under a linear gas flow rate of 40 $mh^{-1}$ at a pressure of 0.12 MPa. The firing weight loss was 117% of theoretical, calculated by following the equation no. 1 as stated above. The sample was blackish grey in colour containing soft agglomerates, grindable to produce fine sized powder. The x-ray diffraction shows SiC as the major crystalline phase.

The Main Advantages of the Present Invention are:

1. Provides a synergistic composition, wherein ground naturally occurring and abundantly available silica is used rather than fine silica produced from a sol-gel technique.
2. Provides a synergistic composition, wherein the surface area of carbon used is of the order of only 35 $m^2/g$ in comparison to that in the range of 150 to 650 $m^2/g$ used in majority of the prior art.
3. Provides a cost effective synergistic composition useful for the preparation of improved silicon carbide powder, which obviates the drawbacks of the hitherto known prior art.
4. Provides a synergistic composition useful for the preparation of silicon carbide powder containing at least 90 wt. % of the phase, which obviates the drawbacks of hitherto known prior art.

We claim:

1. A composition for the preparation of silicon carbide powder, which comprises a source of pure silica in an amount of 41 to 53 weight %; a source of carbon in an amount of 26 to 35 weight %; a β-silicon carbide (β-SiC) in an amount of 3.5 to 14 weight %; and a source of iron in an amount of 12 to 26 weight %.

2. A composition as claimed in claim 1 wherein the source of pure silica is pure and powdered silicon dioxide ($SiO_2$).

3. A composition as claimed in claim 1 wherein ground naturally occurring silica is used as the silica source.

4. A composition as claimed in claim 1 wherein the source of carbon is pure and powdered activated charcoal.

5. A composition as claimed in claim 1 wherein the surface area of carbon used is of the order of 35 $m^2/g$.

6. A composition as claimed in claim 1 wherein β-silicon carbide (β-SiC) used is pure and powdered.

7. A composition as claimed in claim 1 wherein the source of iron is ferric nitrate $Fe(NO_3)_3 \cdot 9H_2O$.

* * * * *